(12) United States Patent
Kwan

(10) Patent No.: US 7,050,589 B2
(45) Date of Patent: May 23, 2006

(54) CLIENT CONTROLLED DATA RECOVERY MANAGEMENT

(75) Inventor: Nang Kon Kwan, Milpitas, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 768 days.

(21) Appl. No.: 09/931,004

(22) Filed: Aug. 17, 2001

(65) Prior Publication Data

US 2003/0035548 A1 Feb. 20, 2003

(51) Int. Cl.
*H04L 9/00* (2006.01)

(52) U.S. Cl. .................. 380/286; 713/155; 713/156; 713/157; 713/158; 713/175; 713/176; 380/278; 380/279; 380/281; 380/282; 380/283; 380/284; 380/285; 726/10

(58) Field of Classification Search ........ 713/200–202, 713/155–158, 178, 168–172, 175–176; 380/277–286; 726/10
See application file for complete search history.

(56) References Cited

U.S. PATENT DOCUMENTS

| | | | |
|---|---|---|---|
| 6,367,013 B1* | 4/2002 | Bisbee et al. ............. | 713/178 |
| 6,553,493 B1* | 4/2003 | Okumura et al. ......... | 713/170 |
| 2002/0029350 A1* | 3/2002 | Cooper et al. ............ | 713/200 |

OTHER PUBLICATIONS

CFSB "How Key Escrow Might Work?", Computer Fraud & Security Bulleton, Jul. 1, 1996.*

* cited by examiner

*Primary Examiner*—Christopher Revak
*Assistant Examiner*—Longbit Chai
(74) *Attorney, Agent, or Firm*—Finnegan, Henderson, Farabow, Garrett & Dunner LLP

(57) ABSTRACT

Methods and systems in accordance with the present invention allow users' private keys corresponding to their digital certificates to be stored and archived outside of the control of a Certificate Authority ("CA"). A CA may have a policy that a user's private key must be archived in order to receive a digital certificate upon a registration request from the user. Typically, the CA knows that the user's private key is archived because it implements the archival of the key, for example, on a data recovery manager and associated internal database that the CA controls. Methods and systems in accordance with the present invention allow for the enforcement of such a policy while allowing the archival of the private keys to be outside of the control of the CA by having a data recovery manager supply a digitally signed proof of archival token with a digital certificate request to a CA. The CA is assured that the key has been archived. Methods and systems allow for the data recovery manager and a database of archived keys to be controlled by other entities, including the user or client, for example.

10 Claims, 6 Drawing Sheets

CLIENT CONTROLLED DATA RECOVERY MANAGEMENT

FIELD OF THE INVENTION

The present invention generally relates to data processing systems, and more particularly, to digital certificates and the archival and recovery of encryption keys.

RELATED ART

With the advent of the Internet and the increasing use of large computer networks by millions of people world-wide, security against fraud becomes a paramount concern. Conducting business in the current e-commerce environment requires a level of security that can withstand intentional attempts by malicious hackers and imposters, as well as protect against accidental erroneous information due to unintentional technological errors. The ability to determine the correct identity of an online entity remains vital to e-commerce and many other computing environments, applications, and purposes. One such way of identifying online identities is through the use of digital certificates.

Digital certificates, or "certificates," are a form of electronic identification used by computers, analogous to, for example, a driver's license. They may be an attachment to an electronic message, and they attest that the issuing authority certifies that the data associated with the certificate, such as the email address of the certificate holder, is indeed accurate and trustworthy for the lifespan of the certificate. A certificate may be used for encrypting messages for the holder, and to verify signatures created by the holder. Digital certificates are described in detail in "Understanding Public-Key Infrastructure: Concepts, Standards, and Deployment Consideration," Carlisle Adams et al., New Riders Publishing (1999), and "Digital Certificates: Applied Internet Security," Jalal Feghhi et al., Addison-Wesley (1999) which are incorporated herein by reference. Certificates provide a highly-secure, bi-directional security mechanism. Not only can individual certificate holders ensure that their emails and other messages are cryptographically secure, recipients can also authenticate the identity of a message's sender. In addition, users can verify the integrity of commercial web sites with which they perform transactions, and those same sites can use certificates to replace traditional username and password access control mechanisms.

For instance, username and password combinations are not secure. If someone steals a username and password, the thief can gain access to controlled data protected by the stolen username and password from anywhere in the world. Once a username and password combination has been compromised, the associated user cannot easily notify the corresponding access-controlled site of the problem. Also, user has to remember every unique combination of usernames and passwords for every access-controlled site with which he interacts.

Certificates are typically issued by Certificate Authorities ("CA") which are trusted third-party organizations or companies that issue digital certificates used to create digital signatures and public-private key pairs. The role of the CA in this process is to guarantee that the individual granted the unique certificate is, in fact, who he or she claims to be. For example, the CA may have an arrangement with a financial institution, such as a credit card company, that provides the institution with information to confirm an individual's claimed identity. CAs are an important component in data security and electronic commerce because they establish a chain of trust so that the two parties exchanging information can be sure they are really who they claim to be.

An individual wishing to send an encrypted message applies for a digital certificate from a CA. The CA issues an encrypted digital certificate containing the applicant's public key and a variety of other identification information. The CA makes its own public key readily available through print publicity or perhaps on the Internet. The recipient of an encrypted message uses the CA's public key to verify the digital certificate attached to the message, verifies it as issued by the CA and then obtains the sender's public key and identification information held within the certificate. With this information, the recipient can send an encrypted reply.

Generally, for signing, the signer uses a private key to sign a document or message, and the verifier use the public key of the signer to verify the document or message. For encryption, the sender uses the public key of the recipient to encrypt the document and sends it to the recipient. The document can then only be decrypted by the recipient's private key. Since the recipient is the only one who has the recipient's the private key, the document is protected during transit. Use of encryption, private and public keys are described in detail in "Understanding Public-Key Infrastructure: Concepts, Standards, and Deployment Consideration," Carlisle Adams et al., which was previously incorporated herein.

In conventional certificate management systems, the CA uses a certificate manager to sign and revoke certificates. The certificate manager also maintains a database of issued certificates so that it can track renewal, expiration, and revocation of certificates. The certificate manager receives and responds to requests to authenticate an entity.

Conventional certificate management systems also have a registration manager to which the certificate manager delegates some certificate management functions. In particular, a registration manager performs tasks such as end-entity authentication and formulation of the certificate requests for the certificate manager. In this configuration, end-entities (e.g., users) register with the registration managers to obtain certificates. Each registration manager authenticates the end-entity for the certificate manager and requests a new certificate for the end-entity from the CA.

Another component of the certificate management system is called the data recovery manager. The data recovery manager archives user's encryption keys for the certificate manager. This way if an end-entity loses a private data-encryption key, the key can be recovered before any data that was encrypted with the corresponding public key can be read.

The data recovery manager stores encryption private keys automatically whenever the associated or connected certificate manager issues certificates to users. The data recovery manager stores encryption private keys in a secure key repository in its internal database; each key is stored as a key record. The archived copy of the key remains encrypted (or wrapped) with the data recovery manager's storage key which uniquely identifies the data recovery manager. It can be decrypted (or unwrapped) only by using the data recovery manager's corresponding private key, to which no individual has direct access. The data recovery manager typically indexes stored keys by key number (or ID), owner name, and a hash of the public key, allowing for highly efficient searching by name or by public key. The data recovery manager uses its private storage key to decrypt and recover an archived key.

For security reasons, the data recovery manager typically is maintained by the CA, but the registration manager may be maintained outside the control of the certificate authority. Some organizations, however, are not comfortable with this conventional architecture because it relinquishes complete control over an organization's private key archive to the certificate authority.

SUMMARY OF THE INVENTION

In accordance with the present invention, a method in a data processing system for requesting a digital certificate from a certificate authority and archiving an encryption key outside of the certificate authority is provided. The method comprises receiving a request from a user for a digital certificate. It further comprises receiving an indication of proof of archival of the user's encryption key associated with the request, wherein the user's encryption key is archived under control of an entity other than the certificate authority.

Furthermore, in accordance with the present invention, a method in a data processing system for archiving an encryption key by an entity other than a certificate authority is provided that comprises receiving an encryption key for archiving, and archiving the received encryption key. The method further comprises creating an indication of proof of archival of the received encryption key and sending the indication of proof of archival.

Additionally, in accordance with the present invention, a data processing system for requesting a digital certificate from a certificate authority and archiving an encryption key outside of the certificate authority is provided that comprises a memory having program instructions and a processor. A data processing system for requesting a digital certificate from a certificate authority and archiving an encryption key outside of the certificate authority. The processor is configured to execute the program instructions to receive a request from a user for a digital certificate, and receive an indication of proof of archival of the user's encryption key associated with the request, wherein the user's encryption key is archived under control of an entity other than the certificate authority.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention.

DETAILED DESCRIPTION

Figure 1:
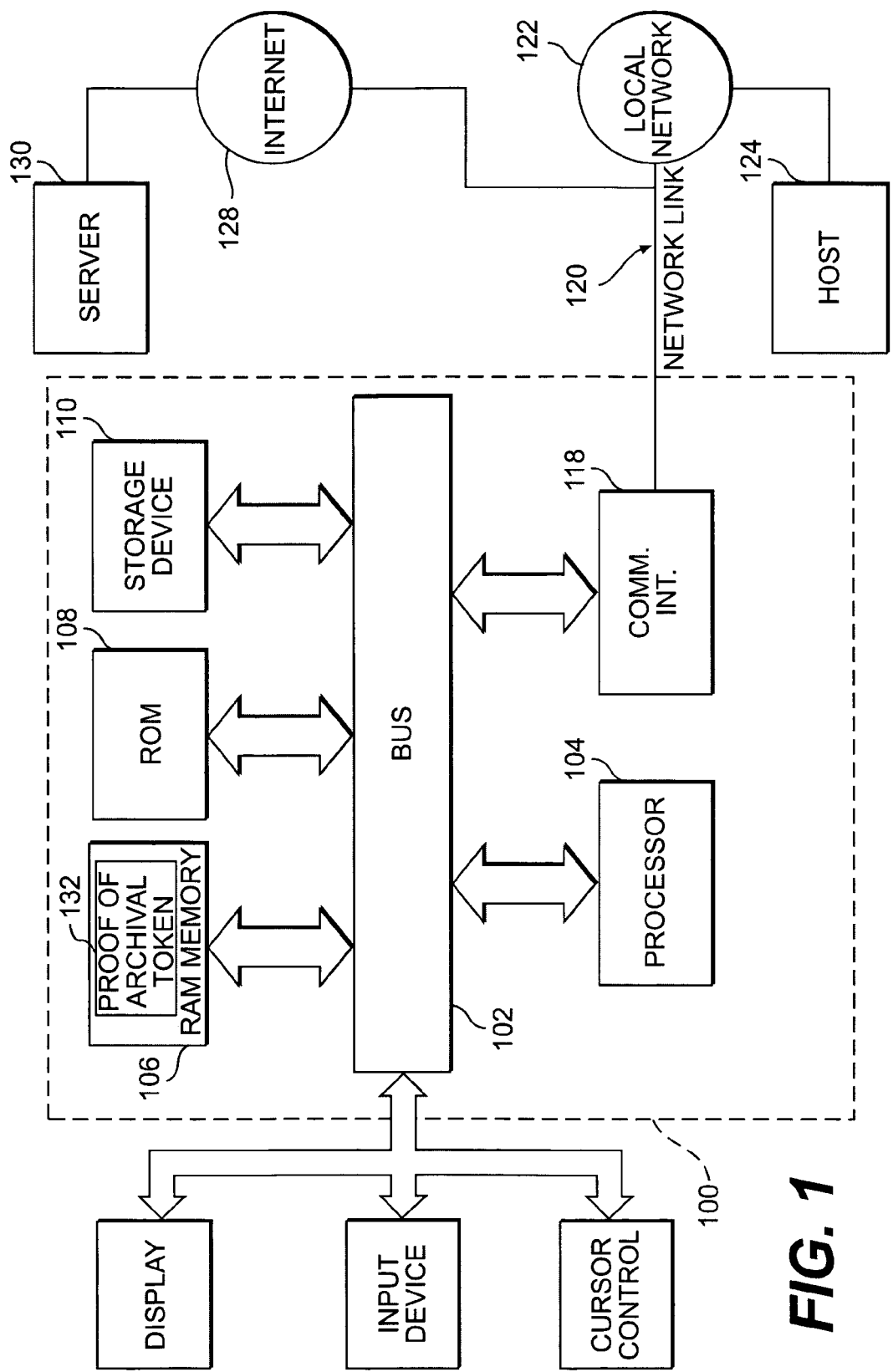
FIG. 1 shows an exemplary computer system suitable for use in accordance with the present invention.

Methods and systems in accordance with the present invention allow users' private keys corresponding to their digital certificates to be stored and archived outside of the control of a Certificate Authority. A CA may have a policy that a user's private key must be archived in order to receive a digital certificate upon a registration request from the user. Typically, the CA knows that the user's private key is archived because it implemented the archival of the key, for example, on a data recovery manager and associated internal database that the CA controls.

However, methods and systems in accordance with the present invention allow for the enforcement of such a policy, i.e., requiring archival of a user's private key to get a certificate, while allowing the archival of the private keys to be outside of the control of the CA. They allow for the data recovery manager and a database of archived keys to be controlled by other entities, including the user or client, for example. In that way, the user or client can keep control over its private keys and reduces the chance that they will be compromised by someone associated with the CA.

In methods and systems in accordance with the present invention, when a registration manager receives a request for a digital certificate from a user and client, it securely sends the user's private key to a data recovery manager that is not controlled by a certificate authority for storage and archiving. In one implementation consistent with principles related to the present invention, the data recovery manager and it's associated database are controlled by the user or user's organization.

The data recovery manager then encrypts the user's private key using the data recovery manager's storage key and stores it in its associated database for archiving. The data recovery manager's private storage key (known only by the data recovery manager or possibly by recovery agents), is needed to decrypt the user's private key from the database. The data recovery manager then creates a "proof of archival" token ("POA") indicating that the associated user's private key has been archived. The data recovery manager digitally signs the proof of archival token with its data recovery manager transport key for secure transmission and sends the signed proof of archival token to the registration manager.

The registration manager verifies, using the data recovery manager's transport public key, that the proof of archival token was actually received from the data recovery manager. If so, the registration manager sends the client's request for a digital certificate to the CA which returns a digital certificate for the user. Because the registration manager received verification that the data recovery manager archived the user's private key, the CA knows that the user's private key is archived. In one implementation consistent with principles related to the present invention, the proof of archival token is sent with the request to the CA.

If the proof of archival token was not verified to have been signed by the data recovery manager, no proof of archival token is returned, and the certificate request may be denied.

Computer Architecture

FIG. 1 is a block diagram that illustrates a computer system 100 in which methods and systems consistent with the invention may be implemented. Computer system 100 may represent any of the computers discussed herein (e.g., client, registration manager, data recovery manager, database, certificate authority, certificate manager) and is not limited to a client or server or otherwise, and embodiments in accordance with the present invention are not limited to any specific combination of hardware and/or software. Any of the components discussed may be hardware or software components.

Computer system 100 includes a bus 102 or other communication mechanism for communicating information, and a processor 104 coupled with bus 102 for processing information. Computer system 100 also includes a main memory 106, such as a random access memory ("RAM") or other dynamic storage device, coupled to bus 101 for storing information and instructions to be executed by processor 104. Main memory 106 may store a proof of archival token 132 which is described below. Computer system 100 further includes a read only memory ("ROM") 108 or other static storage device coupled to bus 102 for storing static information and instructions for processor 104. A storage device 110, such as a magnetic disk or optical disk, is provided and coupled to bus 102 for storing information and instructions. The storage device 110 may also store archived private keys discussed below and may also represent the data recovery managers database also described below.

Computer system 100 may be coupled via bus 102 to a display 112, such as a cathode ray tube ("CRT"), for displaying information to a computer user. An input device 114, such as a keyboard, is coupled to bus 102 for communicating information and commands to processor 104. Another type of user input device is cursor control 116, such as a mouse, for communicating with processor 104 and for controlling cursor movement on display 112.

Computer system 100 also includes a communication interface 118 coupled to bus 102. Communication interface 118 provides a two-way data communication coupling to a network link 120 that may be connected to local network 122. For example, communication interface 118 may be a modem, for example, to provide a data communication connection. As another example, communication interface 118 may be a local area network ("LAN") card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to a wide area network ("WAN") such as the Internet 128. Local network 122 and Internet 128 both use electric, electromagnetic or optical signals that carry digital data streams. The signals through the various networks and the signals on network link 120 and through communication interface 118, which carry the digital data to and from computer system 100, are exemplary forms of carrier waves transporting the information.

Figure 2:
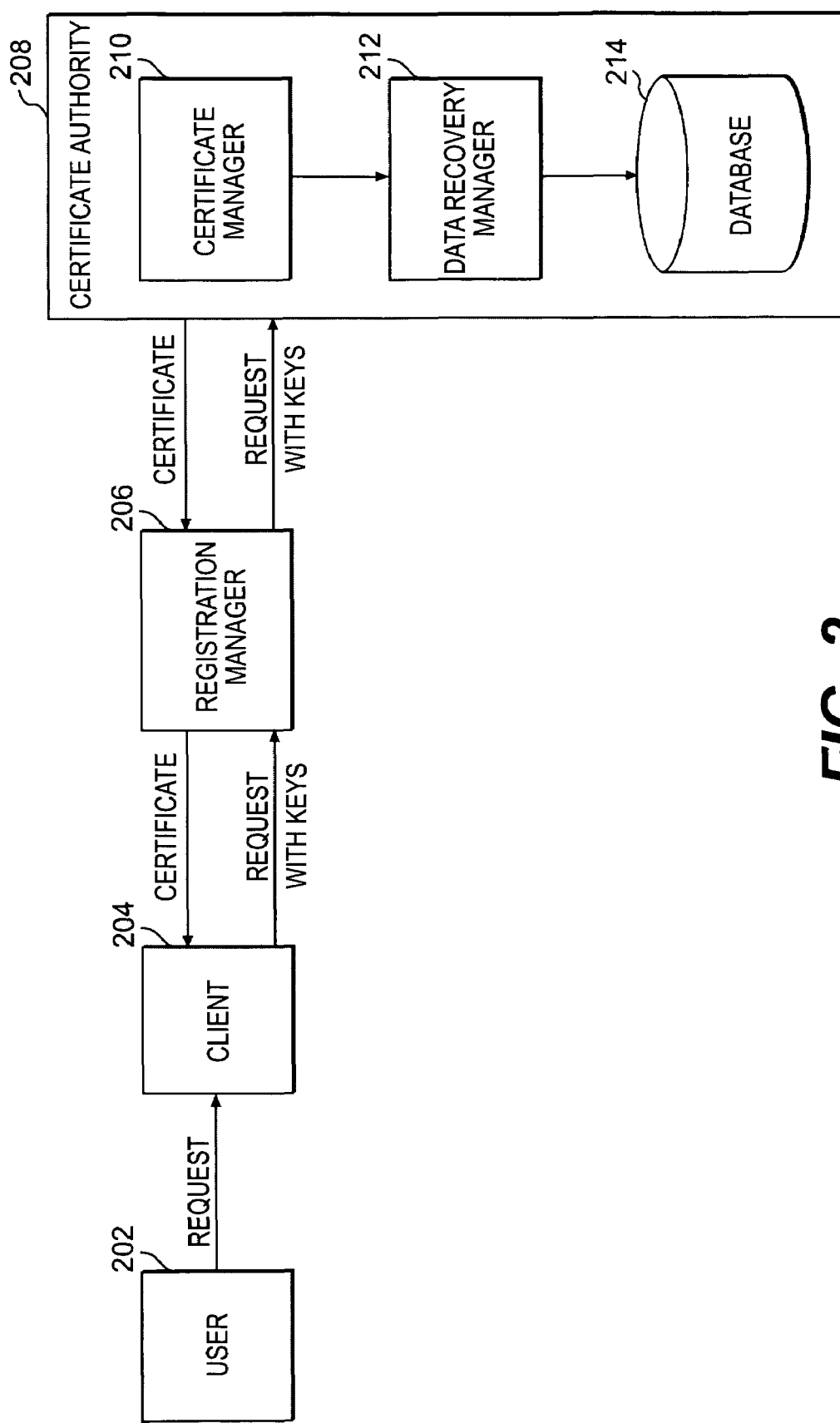
FIG. 2 illustrates an exemplary digital certificate management system having a data recovery manager controlled by a certificate authority.

FIG. 2 shows an exemplary digital certificate management system having a data recovery manager controlled by a certificate authority 208. In this system, a user 202 sends a request via a client 204 for a digital certificate from a CA 208. The client 204 generates a key pair, a public key and a private key, for the user 202. If the user 202 signs a digital message with the private key known only to the user, the public key can be used by an entity to verify that it was in fact the user who signed it.

The client 204 forwards the request, which includes the private key and the public key, to the registration manager 206. The registration manager 206 performs local (organizational) policy checking, and then forwards the request including the user's private key, which is encrypted by the transport certificate, to the CA 208. The certificate manager 210 of the CA 208 handles the incoming request by checking the CA's local policies. If key archival is required by the CA's local policies, then it also sends the user's private key to the data recovery manager 212 for archiving in the associated internal database A14. In this exemplary system, the data recovery manager 212 and key archival database are located on and controlled by the CA 208. Since the CA 208 performed the archiving, it can ensure that a user's private key is archived before issuing a digital certificate.

Figure 3:
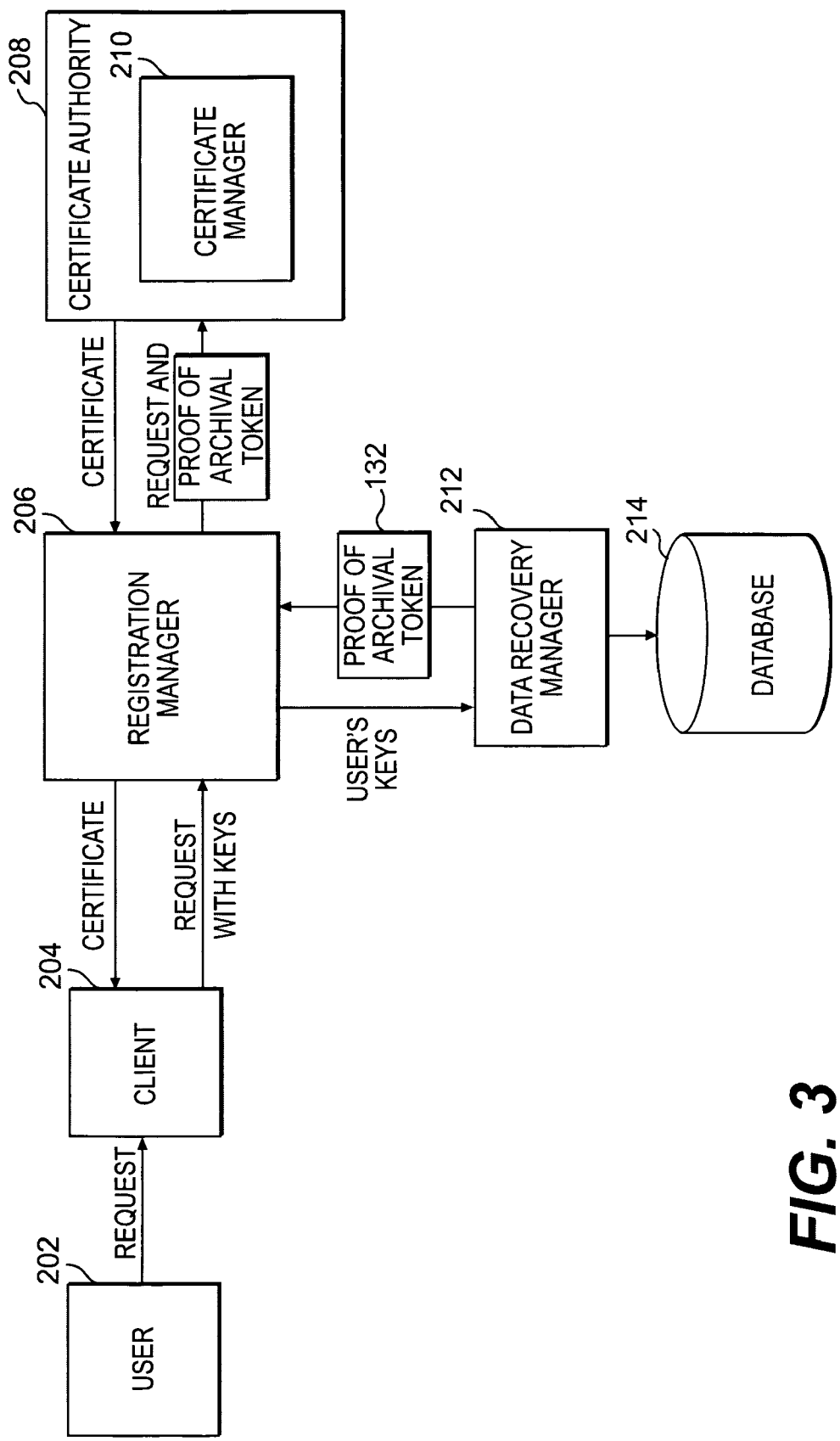
FIG. 3 depicts an exemplary digital certificate management system having a data recovery manager outside of the control of a certificate authority, and sending a signed proof of archival token in accordance with the present invention.

FIG. 3 depicts an exemplary digital certificate management system having a data recovery manager 212 outside of the control of a certificate authority 208 that sends a signed proof of archival token 132 in accordance with features associated with the present invention. In contrast to the system of FIG. 2, the data recovery manager 212 and associated key archival database are not within control of the CA 208. In one implementation consistent with principles related to the present invention, the data recovery manager 212 and associated key archival database are under the control of the user 202.

Figure 4A:
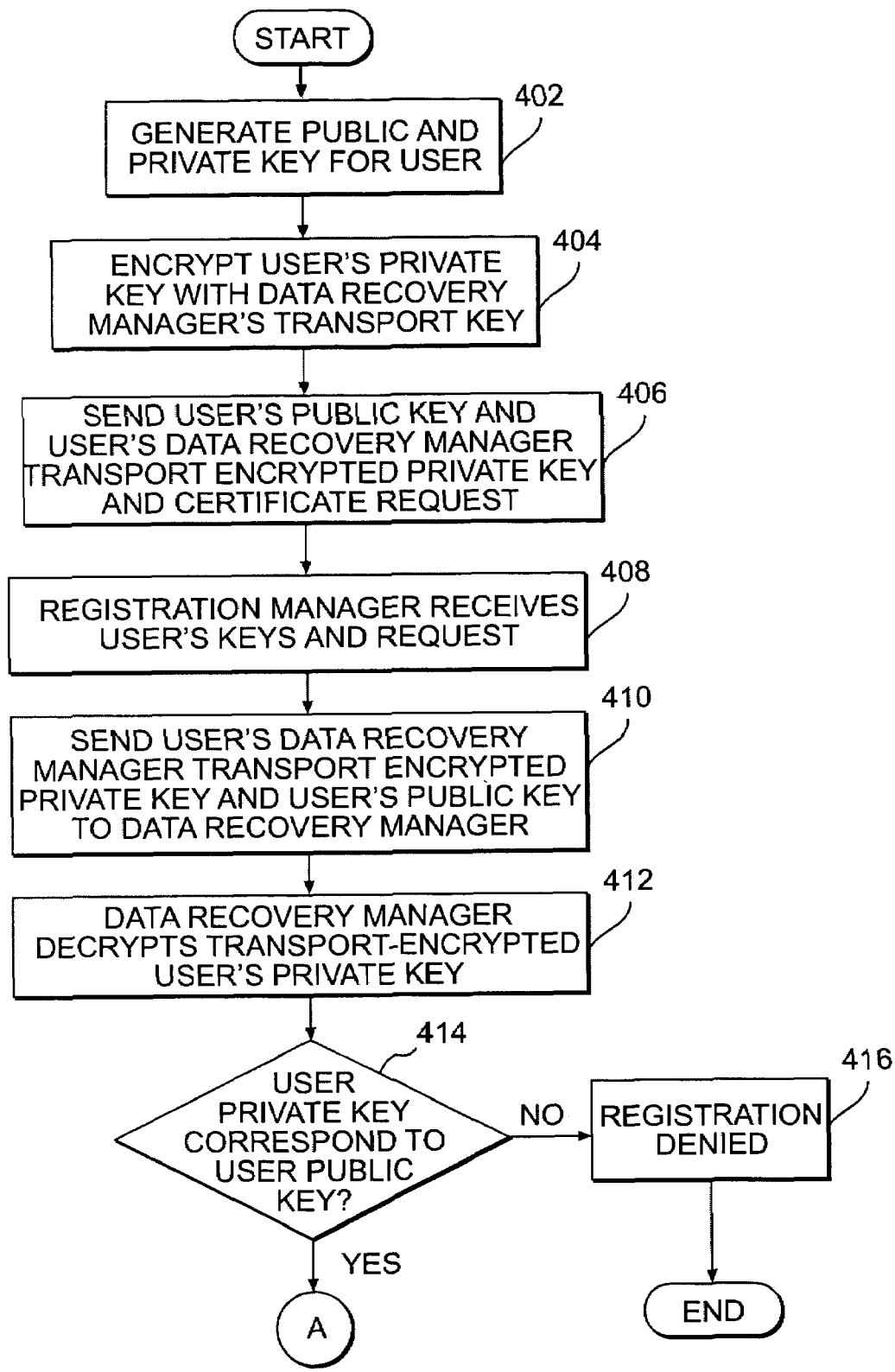
FIGS. 4A–4C are flowcharts depicting steps for providing proof of archival of a private key in a digital certificate management system having a data recovery manager outside of the control of a certificate authority in accordance with the present invention.
Figure 4B:
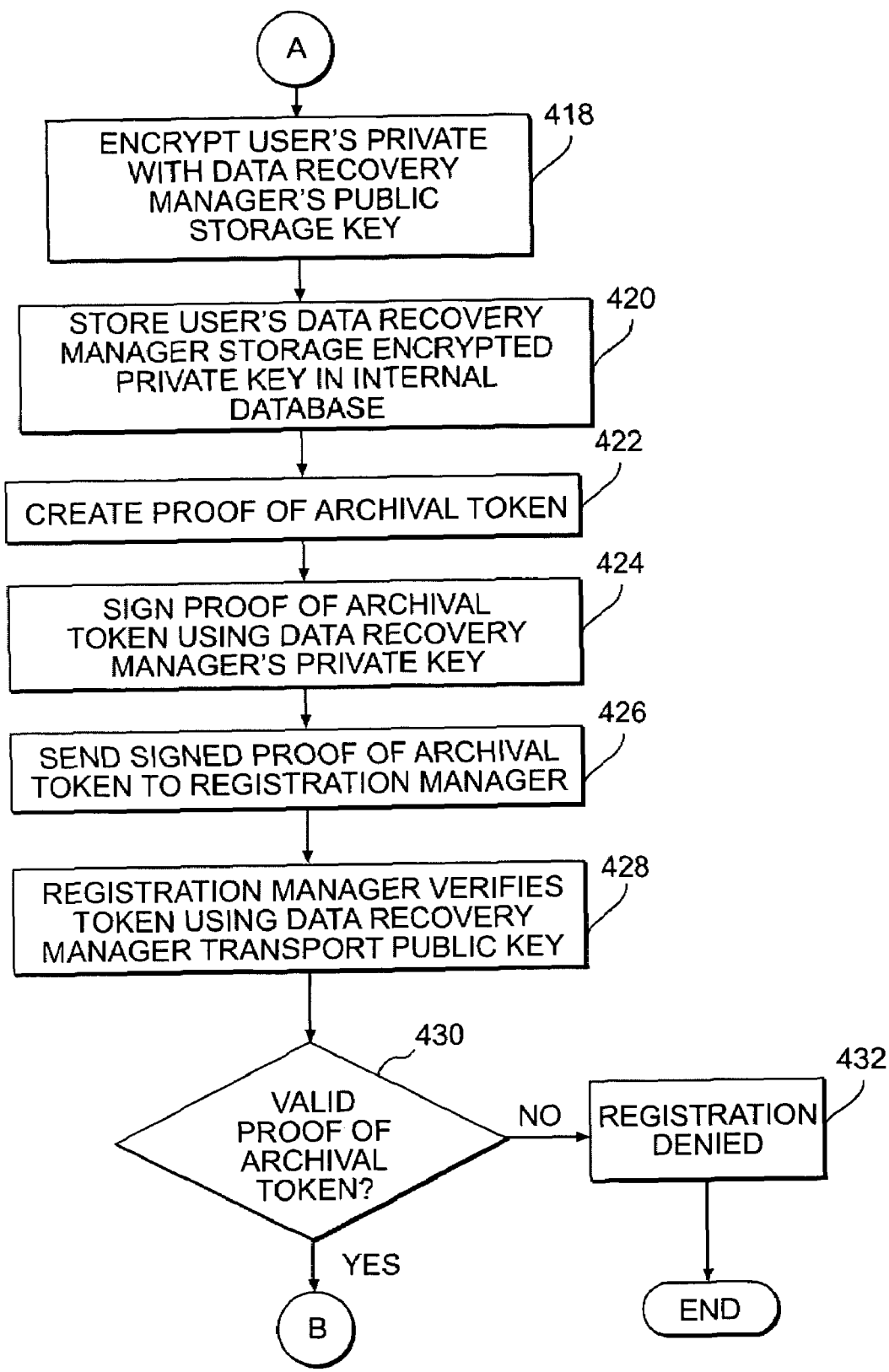
Figure 4C:
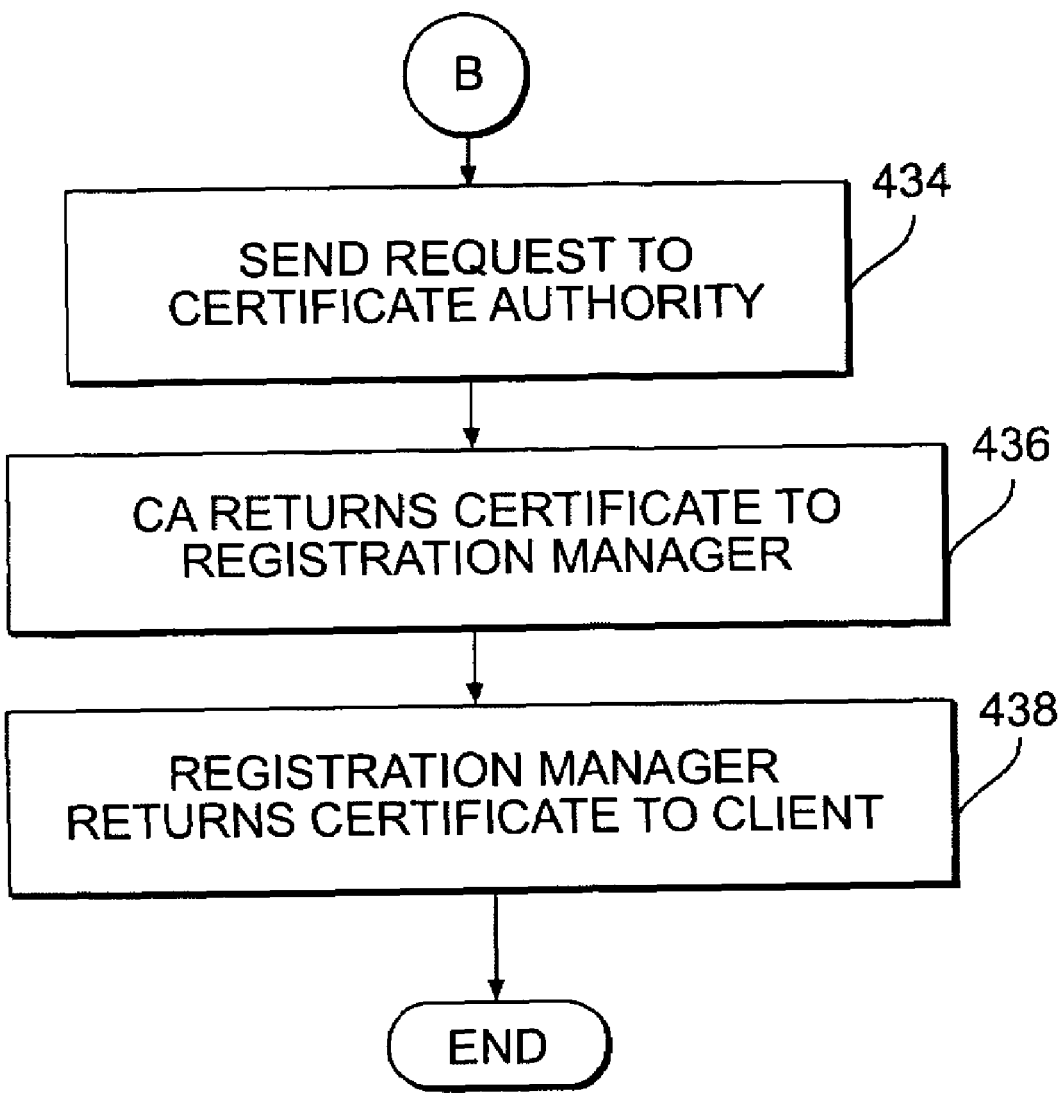

FIGS. 4A, 4B and 4C are flowcharts showing proof of archival of a private key in a digital certificate management system having a data recovery manager outside of the control of a certificate authority 208 in accordance with the present invention, and they will be discussed in conjunction with FIG. 3 to illustrate an implementation in accordance with the present invention. First, a user 202 accesses a client 204 capable of generating dual key pairs for encryption for other users, and the client generates the keys (step 402). This client 204 may access a certificate enrollment form served by the registration manager 206 that is used to provide information for obtaining a digital certificate from the CA 208. The user 202 fills in the information and submits the request through the client 204.

In one implementation consistent with principles related to the present invention, the client 204 automatically securely provides the user's private key to the registration manager 206 for archival. In another implementation consistent with principles related to the present invention, the user's request contains a request for key archival, and the registration manager 206 detects the key archival option in the user's request and asks the client 204 for the user's encryption private key.

The data recovery manager 212 has a transport certificate used to securely transport information to the data recovery manager, so that only the data recovery manager may decrypt it. The public key of the transport certificate may be used to encrypt information to be sent to the data recovery manager 212. A copy of the transport certificate may be embedded in the certificate enrollment form transmitted by the registration manager 206.

The client 204 encrypts the user's private key with the transport public key from the data recovery manager's transport certificate for secure transmission (step 404). The client 204 sends the certificate request, which includes the user's public key and transport-encrypted private key, to the registration manager 206 (step 406). Upon receiving the transport-encrypted key from the client 204 (step 408), the registration manager 206 sends it to the data recovery manager 212 for storage, along with other information including the user's public key (step 410). Then, the registration manager 206 waits for verification from the data recovery manager 212 that the user's private key has been received and stored and that it corresponds to the user's public encryption key.

Upon receipt of the transport-encrypted key from the registration manager 206, the data recovery manager 212 decrypts it with the data recovery manager's transport private key that corresponds to the transport public key in its transport certificate (step 412). The data recovery manager 212 then checks the decrypted user's private key with the user's public key to verify that it originated from the user 202 (step 414). If it does not match with the user's public key, notification is sent to the registration manager 206 and registration is denied (step 416). In this case, no proof of archival token 132 is returned.

If the private encryption key corresponds to the user's public encryption key, the data recovery manager 212 encrypts it again with its public storage key before storing it in its internal database for secure storage (step 418). It then stores it in an associated database which may be internal to the data recovery manager 212 (step 420). In one implementation consistent with principles related to the present invention, the data recovery manager's storage key is not exposed to any other entity. In most instances, the data recovery manager's private storage key may be used to decrypt the user's archived private key from the internal database.

In one implementation consistent with principles related to the present invention, several recovery agents may be used to recover the encrypted archived key and may each have a piece of the private storage key so that no one agent may decrypt it. In this case, for added security, multiple recovery agents are required to decrypt a stored private key.

In another implementation consistent with principles related to the present invention, the recovery agents' pieces of the storage private key are protected by passwords.

Once the user's private encryption key has been successfully stored, the data recovery manager 212 creates a proof of archival token 132 (step 422). The proof of archival token 132 may be a portion of software defined, for example, in the Java™ programming language. An exemplary proof of archival token 132 is shown:

ProofOfArchival::=SEQUENCE {
   tbsProofOfArchival TBSProofOfArchival,
   signatureAlgorithm AlgorithmIdentifier,
   signaturevalue BIT STRING
}
TBSProofOfArchival::=SEQUENCE {
   version [0] Version DEFAULT v1,
   signature AlgorithmIdentifier,
   serialNumber INTEGER,
   subjectName Name,
   issuerName Name,
   subjectPublicKeyInfo subjectPublicKeyInfo,
   dateOfArchival Time,
   extensions [1] Extensions OPTIONAL
}

The following are definitions for portions of the above code:
Name, Time, Extensions are defined in the X.501 standard.
Version—version of the implementation of the proof of archival.
Serial Number—Unique ID for the proof of archival.
Subject Name—The name of the owner of the archived key.
Issuer Name—The name of the data recovery manager 212.
Date of Archival—specifies the date when the key is archived.
Extensions—for optional expansion.
Subject Public Key Info—The corresponding public key for the private key that is being archived.
Signature—The algorithm identifier for the algorithm used by the data recovery manager 212 to sign the proof of archival.

The data recovery manager 212 uses the transport private key to sign the proof of archival token 132 which confirms that the user's key has been successfully stored (step 424). The data recovery manager 212 then sends the signed proof of archival token 132 to the registration manager 206 (step 426).

The registration manager 206 receives and verifies the signed token 132 by using the transport public key to verify that the proof of archival token originated from the data recovery manager 212 (step 428). If it is valid and determined to have originated from the data recovery manager 212 (step 430), the registration manager 206 then sends the certificate request to the certificate manager 210 for issuance of a certificate (step 434). In one implementation consistent with principles related to the present invention, the proof of archival token 132 is sent to the certificate manager 210 with the request. If it is not valid, registration is denied (step 432).

The certificate manager 210 formulates a certificate for the user 202 and returns it to the registration manager 206 (step 436). In one implementation, two certificates are returned, one each for signing and encryption key pairs. The registration manager 206 forwards the certificate(s) to the client 204 which, in turn, returns it to the user 202 (step 438).

In one implementation consistent with the principles related to the present invention, the three subsystems (registration manager 206, data recovery manager 212 and certificate manager 210) subject the request to configured policy rules that govern the request at appropriate stages. If the request fails to meet any of the policy rules, the subsystem may reject the request.

Other embodiments of the invention will be apparent to those skilled in the art from consideration of the specification and practice of the invention disclosed herein. Furthermore implementations consistent with the present invention may be implemented by computer programs that may be stored on computer-readable media. It is intended that the specification and examples be considered as exemplary, with a true scope and spirit of the invention being indicated by the following claims.

What is claimed is:

1. A method in a data processing system for requesting a digital certificate from a certificate authority and archiving an encryption key outside of the certificate authority, comprising:
   receiving, at a registration manager, a request from a user for a digital certificate, the request including an encryption key associated with the user;
   encrypting the user's encryption key with a first archival key;
   providing, by the registration manager, the user's encryption key that is encrypted with the first archival key;
   storing, by a recovery manager, the encrypted user's encryption key in a database;
   providing, by the recovery manager to the registration manager, an indication of proof of storing the encrypted user's encryption key, wherein the indication of proof is signed with a second archival key;
   verifying, by the registration manager, the signed indication of proof based on the first archival key; and providing, by the registration manager, the request to the certificate authority based on the verification of the signed indication of proof.

2. The method of claim 1, further comprising the step of sending a digital certificate from the certificate authority to the user in response to the certificate authority receiving a second request from the registration manager.

3. The method of claim 1, further comprising:
encrypting, by a client associated with the user, the request with a transport key; and
sending the transport encrypted request to the registration manager.

4. The method of claim 3, further comprising:
decrypting, by the recovery manager, the transport encrypted request.

5. The method of claim 1, wherein the second archival key is a data recovery manager private key.

6. The method of claim 1, wherein the user's encryption key is archived under control of the user.

7. A method in a data processing system for requesting a digital certificate from a certificate authority and archiving an encryption key outside of the certificate authority, comprising:
receiving a request for a digital certificate from a user to a registration manager, the request including an encryption key associated with the user;
providing, by the registration manager to a recovery manager, the user's encryption key that is encrypted with a first archival key;
digitally signing, at a recovery manager, an indication of proof of archival of the encryption key for the user in a database;
verifying, by the registration manager, the digitally signed indication of proof based on a first archival key;
sending, by the registration manager to the certificate authority, a request for a digital certificate based on the verifying; and
receiving, from the certificate authority, a digital certificate in response to the request.

8. A data processing system for requesting a digital certificate from a certificate authority and archiving an encryption key under control of an entity other than the certificate authority, comprising:
a registration manager configured to receive a digital certificate request including a user's encryption key, send the user's encryption key, and in response receive an indication of proof of archival of the user's encryption key;
a data recovery manager configured to receive the user's encryption key, send the user's encryption key to a database controlled by an entity other than the certificate authority for archiving, create the indication of proof of archival, and send the indication of proof of archival to the registration manager; and a certificate authority configured to receive, from the registration manager, a request for a digital certificate for the user, the request including the indication of proof of archival, and issue a digital certificate when it is determined that the indication proof of archival was received.

9. A computer-readable medium containing instructions for controlling a data processing system to perform a method for requesting a digital certificate from a certificate authority and archiving an encryption key outside of the certificate authority, the method comprising the steps of:
receiving, at a recovery manager, a user encryption key from a registration manager that manages certificates for the user, the encryption key being signed by a first archival key;
digitally signing, by the recovery manager, an indication of proof of archival of the user's encryption key in a database under the control of an entity separate from the certificate authority, wherein the indication of proof is signed with a second archival key;
providing, by the recovery manager, the signed indication of proof to the registration manager;
verifying, by the registration manager, the digitally signed indication of proof based on the first archival key;
sending, by the registration manager, a request for a digital certificate based on the verified digitally signed indication of proof; and
receiving, by the registration manager, a digital certificate in response to the request.

10. A data processing system for requesting a digital certificate from a certificate authority and archiving an encryption key outside of the certificate authority, comprising:
a registration manager including:
means for receiving a request from a user for a digital certificate, the request including an encryption key associated with the user that is encrypted using a first archival key;
a recovery manager including:
means for storing the encrypted user's encryption key in a database;
means for providing an indication of proof of storing the encrypted user's encryption key, wherein the indication of proof is signed with a second archival key;
wherein the registration manager further includes means for verifying the signed indication of proof based on the first archival key, and means for providing the request to the certificate authority based on the verification of the signed indication of proof.

* * * * *